J. H. DEARBORN.
AUTOMATIC SLACK ADJUSTER FOR AUTOMOBILES.
APPLICATION FILED SEPT. 6, 1918.
1,294,424.
Patented Feb. 18, 1919.
2 SHEETS—SHEET 2.
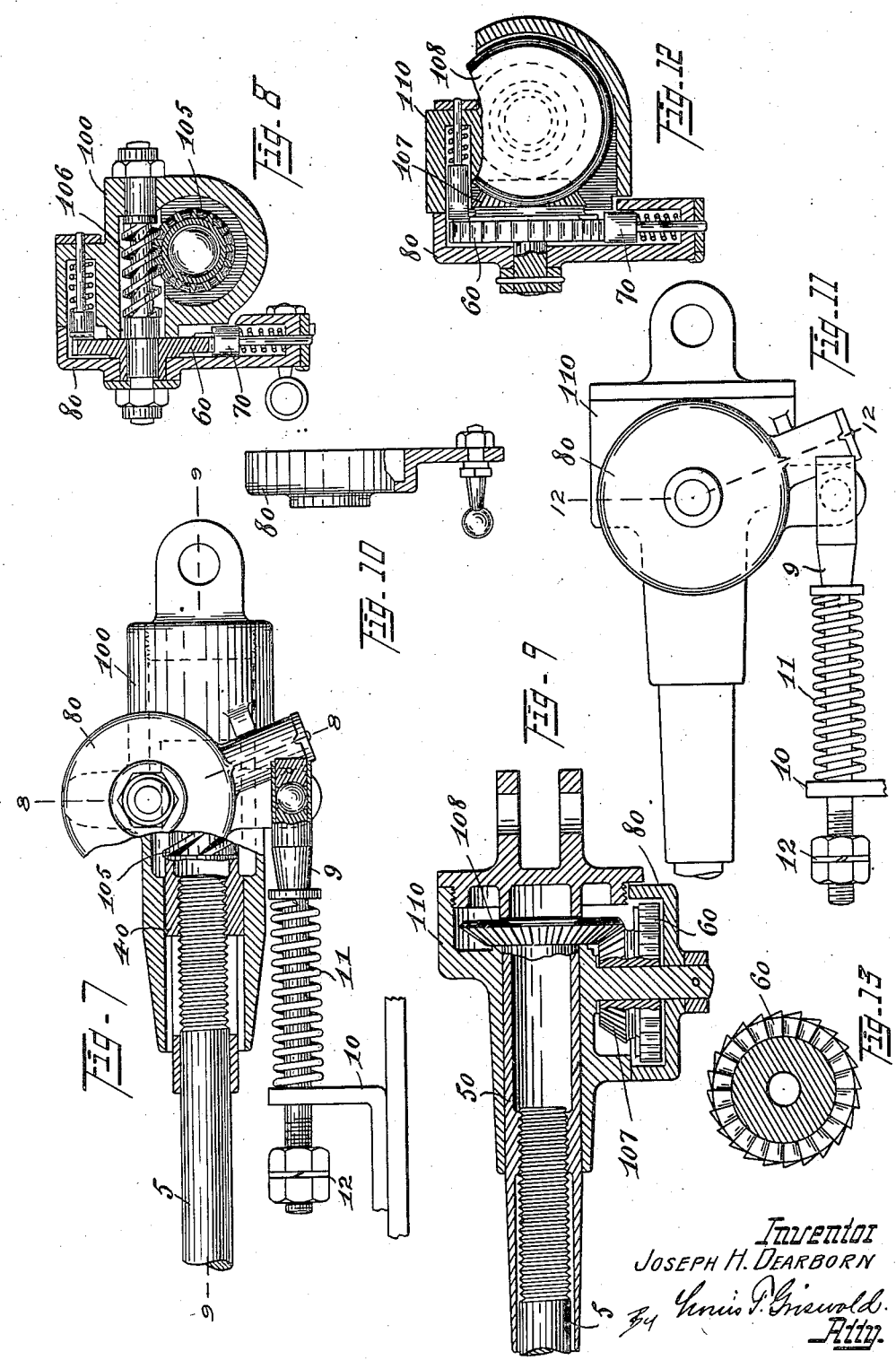
Inventor
JOSEPH H. DEARBORN

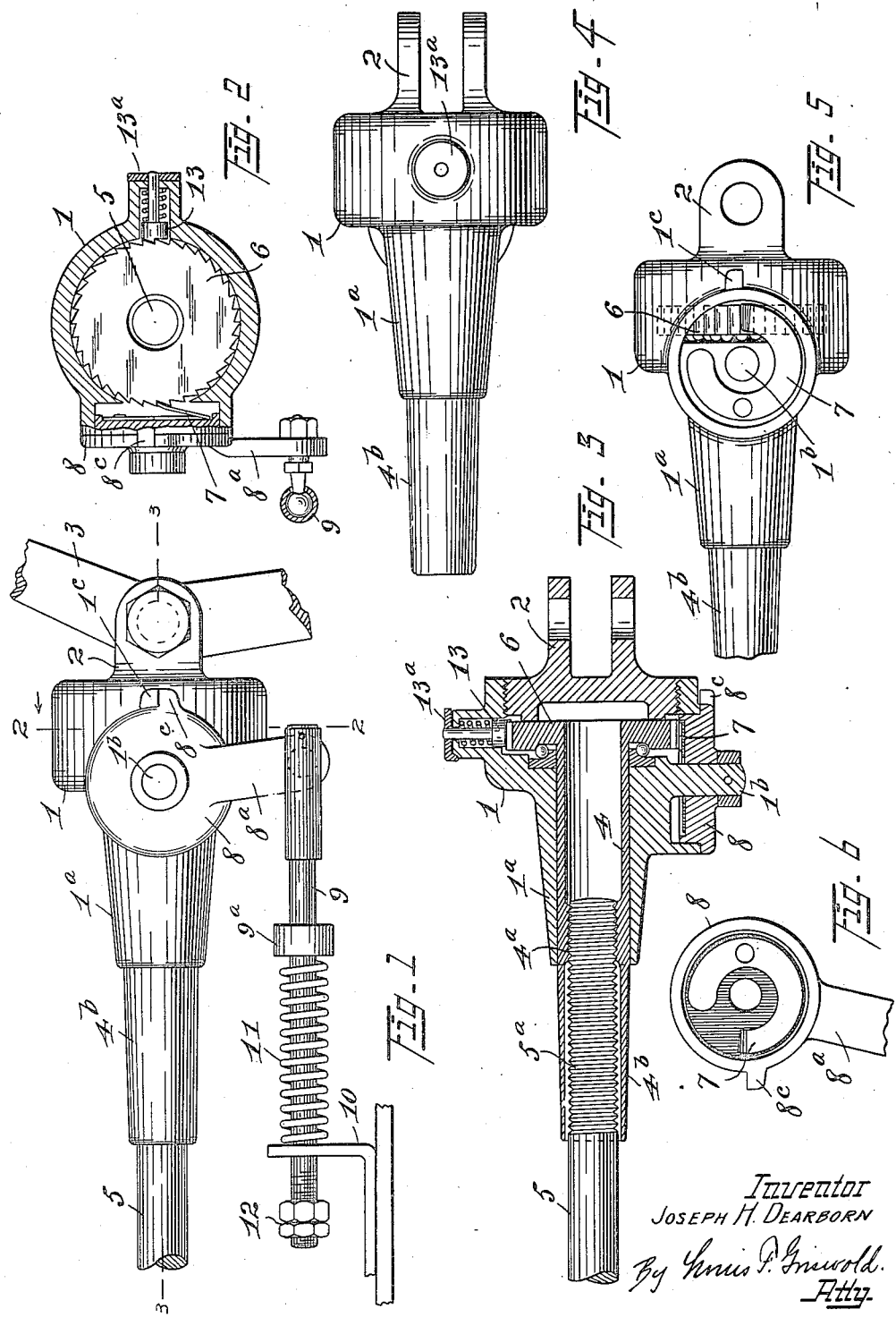

UNITED STATES PATENT OFFICE.

JOSEPH H. DEARBORN, OF LAKEWOOD, OHIO.

AUTOMATIC SLACK-ADJUSTER FOR AUTOMOBILES.

1,294,424.

Specification of Letters Patent.   Patented Feb. 18, 1919.

Application filed September 6, 1918. Serial No. 252,869.

*To all whom it may concern:*

Be it known that I, JOSEPH H. DEARBORN, a citizen of the United States, residing at Lakewood, in the county of Cuyahoga and State of Ohio, have invented certain new and useful Improvements in Automatic Slack-Adjusters for Automobiles, of which the following is a specification.

This invention relates to the construction of devices whose function is the elimination of slack from the control rods of the brake-rigging, or of certain clutches used on automobiles, the same being applicable to rigging operated by hand, foot, or other power.

The primary object of the present invention is to provide a novel construction adapted to operation exclusively on automobiles in connection with the brake-rigging for taking up the slack incidental to wear or other causes.

Another object of the invention is the provision of simple, accurate, and durable means for the purpose set forth, that operates automatically and efficiently, requiring practically no attention after being first properly installed.

With these and other apparent objects and advantages particularly applicable to automobiles, in view, the invention consists in the construction, combination and arrangement of the parts as hereinafter described in the specification and pointed out definitely in the appended claims, reference being had to the accompanying drawings which are made a part of the specification, similar characters of reference being employed to designate corresponding parts.

In the said drawings Figure 1 is an elevation of a preferred embodiment of the invention.

Fig. 2 is a section substantially on line 2—2, Fig. 1, and Fig. 3 is a section on line 3—3, Fig. 1.

Fig. 4 is an elevation of the housing member looking from the opposite side of Fig. 1.

Fig. 5 is a view similar to Fig. 1 with certain elements eliminated, and showing a spring pawl detached from its operating member.

Fig. 6 is an inside view of the ratchet operating member employed.

Fig. 7 is a view partially in elevation and partially in section of a modified form of the device, and Fig. 8 is a section on line 8—8, Fig. 7.

Fig. 9 is a section on line 9—9, Fig. 7.

Fig. 10 is a view partially in section of a detail hereinafter identified.

Fig. 11 is an elevation of another modification.

Fig. 12 is a section on line 12—12, Fig. 11, and Fig. 13 is a sectional view of the ratchet shown in Fig. 9.

As hereinbefore stated the present invention is confined exclusively to automobiles and is particularly applicable for attachment to the brake-rigging for the purpose of taking up the slack. There has however, been patented a clutch operating mechanism to be used exclusively on automobiles, wherein a control rod is employed, the operation of said control rod being the same as the brake rod. Therefore while I have not shown the clutch mechanism, I anticipate the use of the present invention in connection with such a mechanism, the clutch control-rod being the equivalent of the brake-rod shown and described.

A preferred embodiment of the present invention is illustrated in Figs. 1 to 6 inclusive, and comprises a housing 1 provided with a bifurcated member 2 to which the operating lever 3 is pivoted. The housing 1 is provided with a sleeve $1^a$. A tubular member 4 is mounted in said housing, said tubular member extending through the sleeve $1^a$. A portion of the member 4 is internally threaded as shown at $4^a$, Fig. 3, to accommodate the thread $5^a$ on the control rod 5, and an unthreaded extension $4^b$ provides a protecting shield for the control rod thread. A ratchet disk 6 is rigidly attached to the interior end of the member 4 and is adapted to rotate said member, and thereby adjust the rod 5 relatively to the housing 1, through the threaded connection of said rod with the member 4. The member 4 is intermittently rotated by the disk 6 being actuated by a spring pawl 7, said pawl being attached to the interior face of a lever-cap 8 which is mounted on a trunnion $1^b$ of the housing 1. The cap 8 is provided with an arm $8^a$ to which is attached, preferably by a ball-and-socket connection, a connecting rod 9. The rod 9 has a resilient movable connection with a fixed bracket 10, said bracket being attached to some part of the automobile that does not have the same relative movement as the control rod. Resiliency is imparted to the rod 9 by the spiral spring 11 confined between the shoulder member 9ª and the bracket 10, and the forward movement of the rod is adjustably controlled by the nuts 12.

The operation of the device is as follows: When pressure is applied to the operating lever 3, the housing 1 and its equipment are moved forward. The control rod 5 is first adjusted through the medium of its threaded connection with the member 4, so that the movement of the operating lever 3 a predetermined distance will primarily make the rod 5 taut. The connecting rod 9 is adjusted by means of the nuts 12, so that during the primary movement of the control rod 5 the member 8 and spring pawl 7 will idle. When the rod 5 becomes slack, from any cause, thereby allowing an increased forward movement of the housing 1, the forward movement of the connecting rod 9 is checked by the bracket 10, thus causing the member 8 to oscillate and rotate the member 4 through the engagement of the pawl 7 with the ratchet disk 6, said rotation occurring at the time the rod 5 is released, and thereby take up the slack through the threaded connection of member 4 with the rod 5. A retaining pawl 13 is provided, which may be freed from engagement with the ratchet by the attached plate 13ª. Stop means are provided for controlling the oscillation of the lever 8, said means comprising a fixed member 1ᶜ on the housing 1, and a fixed member 8ᶜ on the lever 8.

A salient factor of the preferred embodiment of the invention is the novel design and arrangement of the spring pawl 7 and its co-action with the ratchet member 6. This construction provides a factor of safety and is highly efficient, the buffer taking up the slack without exerting severe stress on the co-acting or associated elements. It is more economical to manufacture and more convenient for adjustment, as the spring pawl 7 can be readily disengaged from the ratchet 6 without dismantling the device.

In the modification illustrated in Figs. 7 and 8, the generic principles are the same as those of the preferred embodiment hereinbefore described. The ratchet member 60 is actuated by a pawl 70 controlled by the oscillation of the lever 80, which is in turn operated by the adjustable movement of the connecting rod 9. Intermittent rotation is imparted to the member 40 through the co-action of the ratchet 60 and the worm gears 105 and 106 thereby taking up the slack through the medium of the threaded connection of the rod 5 with the member 40, said member being the equivalent of the member 4 and the housing 100 being the equivalent of the housing 1.

In the embodiment illustrated in Figs. 9, 11 and 12, the same principles prevail, companion gears 107 and 108 being employed to co-act with the ratchet 60 for imparting intermittent rotation to the member 50, which performs the same function as the member 4 of the preferred form.

Having now described my invention, what I claim and desire to secure by Letters Patent is:—

1. An automatic take-up means for control rods on automobiles, comprising an operating lever, a movable housing to which said lever is pivoted, take-up means rotatably mounted in said housing, a control rod having a threaded connection with the rotatable take-up member, pawl and ratchet members co-acting with said take-up member, means for intermittently actuating said pawl and ratchet members, said means comprising a rod connected with said members and a fixed bracket, a spring mounted upon the rod, said rod being adjustable, permitting a resilient variable movement in the bracket.

2. In a slack adjuster for automobile brake-rigging, an operating lever pivoted to a movable housing, a take-up member rotatably mounted in said housing, a brake rod having a threaded connection with the rotatable take-up member, pawl and ratchet members co-acting with said take-up members, means for intermittently actuating said pawl and ratchet members, said means comprising a rod connected with said members and a fixed bracket, said rod being adjustable longitudinally in the bracket and having a spring mounted thereon for regulating the movement of the rod in the bracket.

3. In a slack adjuster for automobile brake-rigging, the combination of an operating lever; a movable housing to which said lever is pivoted; a ratchet disk rotatably mounted in said housing; a sleeve attached to said ratchet disk; a brake control rod threaded in said sleeve; a spring pawl pivoted on the housing for intermittently actuating the ratchet; and means for actuating said pawl, said means comprising a rod connected with the pawl member and a fixed bracket, said rod being adjustable longitudinally in the bracket and having a spring mounted thereon for regulating the movement of the rod in the bracket.

4. In a slack adjuster for automobile brake-rigging the combination of an operating lever; a movable housing to which said lever is pivoted; a ratchet disk rotatably mounted in said housing; a sleeve attached to said housing; a brake control rod threaded in said sleeve; a spring pawl pivoted on the housing for intermittently actuating the ratchet; a retaining pawl mounted in the housing; and means for actuating the ratchet operating pawl, said means comprising an oscillating lever carrying the ratchet operating pawl, a rod connected therewith and a fixed bracket, a spring upon said rod, said spring effecting a resilient movement of said oscillating lever.

5. In a slack adjuster for automobile brake-rigging the combination of an operating lever; a movable housing to which said lever is pivoted; an internally threaded take-up member rotatably mounted in said housing; a brake control rod threaded in said take-up member; a tubular extension on the take-up member that provides a protection to the thread on the brake control rod; pawl and ratchet members connected with the take-up member for rotating said take-up member; an oscillating lever mounted on the housing for operating the pawl and ratchet; and means for intermittently actuating said lever, said means comprising a rod connected with said lever and a fixed bracket, a spring upon said rod, said spring effecting a resilient movement of said rod and the ratchet operating pawl.

6. In a slack adjuster for automobile control rods, an operating lever, a movable housing to which said operating lever is pivoted, a take-up member rotatably mounted in said housing, a control rod having threaded connection with the rotatable member, a ratchet wheel attached to the rotatable take-up member, an oscillating lever mounted on the housing, a spring pawl attached to said oscillating lever and adapted to engage the ratchet member for rotating said member, and adjustable means for intermittently oscillating said lever, said means comprising a rod connected with said lever and a fixed bracket, a spring mounted upon said rod, said spring effecting a resilient movement of said oscillating lever, and a retaining pawl in the housing, coacting with the ratchet.

7. In automatic take-up mechanism for control rods on automobiles, an operating lever; a movable housing to which said lever is pivoted; take-up means rotatably mounted in said housing; a control rod having a threaded connection with the rotatable take-up member; pawl and ratchet members located at right angles to and co-acting with said take-up member; means for intermittently actuating said pawl and ratchet members, said means comprising a connecting rod operating in the same general direction as the brake rod and having a spring mounted thereon that effects a resilient movement to said rod; and means for adjusting said movement.

In testimony whereof I affix my signature.

JOSEPH H. DEARBORN.